United States Patent
Feldmann

(10) Patent No.: US 6,284,180 B1
(45) Date of Patent: Sep. 4, 2001

(54) METHOD TO CURE ENDLESS TRACK BELTS AND APPARATUS THEREFOR

(75) Inventor: Thomas Brian Feldmann, St. Marys, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/403,629

(22) PCT Filed: May 16, 1997

(86) PCT No.: PCT/US97/08665

§ 371 Date: Nov. 4, 1999

§ 102(e) Date: Nov. 4, 1999

(87) PCT Pub. No.: WO98/51482

PCT Pub. Date: Nov. 19, 1998

(51) Int. Cl.[7] .............................. B29C 35/02; B29D 29/08; F16G 1/06
(52) U.S. Cl. ..................... 264/254; 264/296; 425/34.2; 425/195; 425/343; 425/384; 425/394
(58) Field of Search ......................... 264/236, 254, 264/296; 425/28.1, 34.1, 34.2, 193, 195, 343, 384, 394

(56) References Cited

U.S. PATENT DOCUMENTS

| | | | |
|---|---|---|---|
| 4,207,052 | 6/1980 | Satzler | 425/394 |
| 4,283,366 | 8/1981 | Grawey | 264/502 |
| 4,575,445 | 3/1986 | Fujita et al. | 264/291 |
| 4,721,498 | 1/1988 | Grob | 474/261 |
| 5,110,274 | 5/1992 | Hatai et al. | 425/28.1 |
| 5,211,609 | 5/1993 | Haines | 474/260 |
| 5,536,464 | 7/1996 | Muramatsu | 264/254 |
| 5,575,729 | 11/1996 | Feldman et al. | 474/260 |

FOREIGN PATENT DOCUMENTS 0 308 550 A1   3/1989  (EP) .

*Primary Examiner*—Leo B. Tentoni
(74) *Attorney, Agent, or Firm*—David L King; Marc R Dion, Sr.

(57) ABSTRACT

A method of curing large endless track rubber belts uses a multi-platen mold assembly with a pair of fully supporting indexing wheels, non-preformed lug preparation and a post-forming cavity pressure reduction to provide cured tracks with non-deformed reinforcing members while avoiding the extrusion of rubber compound out of the ends of the molds. Also provided is an apparatus for curing large endless track belts having fully supported indexing wheels.

19 Claims, 6 Drawing Sheets

METHOD TO CURE ENDLESS TRACK BELTS AND APPARATUS THEREFOR

FIELD OF THE INVENTION

This invention relates to the curing of large endless track belts such as are illustrated in U.S. Pat. Nos. 4,721,498; 5,211,609; 5,575,729 and 5,536,464.

BACKGROUND OF THE INVENTION

The use of double platen presses for curing endless belts and conveyor belts has been known for some time. Two major problems were generally encountered, the containment of the rubber within the molds and the movement of the reinforcement within the belts such as tension members. In U.S. Pat. No. 5,110,274, there is disclosed a mold for vulcanizing cogged V-belts including cooling water ports at each end of the mold and also cog peak cavities at each end which are narrower than the central part of the mold. In U.S. Pat. No. 5,536,464, there is described a set of molds and subplates and a method of curing rubber track. The first mold has cooling water ports at each end to provide a plurality of semi-vulcanized lugs at each end with fully vulcanized lugs between. The second set of molds have no cooling ports and the process is designed to have the semi-vulcanized lugs from adjacent sections within the cavities of the second set of molds. The apparatus and method of the '464 patent are complicated and tedious.

SUMMARY OF THE INVENTION

The present invention provides a much simpler method of curing rubber track belts using a minimum of equipment and with a fewer number of steps. In accordance with the practice of the present invention, there is provided a method for curing endless track belts comprising:

a) providing a pair of upper and lower heated mold assemblies having an entrance end, an exit end, cooling water ports at each end, outer tread lug cavities in one half of a mold assembly, inner guide lug cavities in the other half of the mold assembly and a pair of fully supporting indexing wheels on opposing ends of the mold assemblies;

b) placing a green track belt carcass having a slab of tread lug compound built up on the outer surface thereof in between the mold halves and around the indexing wheels;

c) placing non-preformed slugs of inner guide lug compound in the inner guide lug cavities of the upper mold assembly and on the carcass opposite the guide lug cavities of the lower mold assembly;

d) turning on the water to all the cooling ports;

e) closing the mold halves at such a designated high pressure to form the tread lugs and guide lugs in a series of alternating bumps between high pressure and a much lower or no pressure to form the lugs;

f) applying a constant lower pressure to allow the lugs to expand into the cavities and the molds to separate until the first heat is complete;

g) opening the mold halves and indexing the belt a distance x which is less than the length of the molds until the lugs that were formed in the cavities next to the cold entrance end are aligned with the cavities at the exit end;

h) shutting off the cooling water at the exit end of the molds;

i) placing additional slugs of guide lug compound in the empty cavities of the upper mold and on the carcass opposite the empty cavities of the lower mold and repeating steps e, f and g for the second and subsequent heats prior to the final heat;

j) shutting off the cold water to the entrance ends of the molds;

k) placing additional slugs of guide lug compound in the empty cavities of the upper mold and on the carcass opposite the empty cavities of the lower mold and repeating steps e and f to form the final track belt; and l) removing the track belt from the mold assemblies.

There is also provided an apparatus for curing large endless belts comprising:

a) a pair of double platen mold assemblies having outer tread lug cavities, inner guide lug cavities, entrance ends, exit ends and cooling water ports at each end;

b) pressure cylinders to impart a cavity pressure of 1.4 to 8.4 MPa; and c) fully supporting indexing wheels, wherein the indexing wheels provide support across the entire width of the belt with a force of 0.14–3.5 MPa during the curing cycle.

DESCRIPTION OF THE INVENTION

Figure 1:
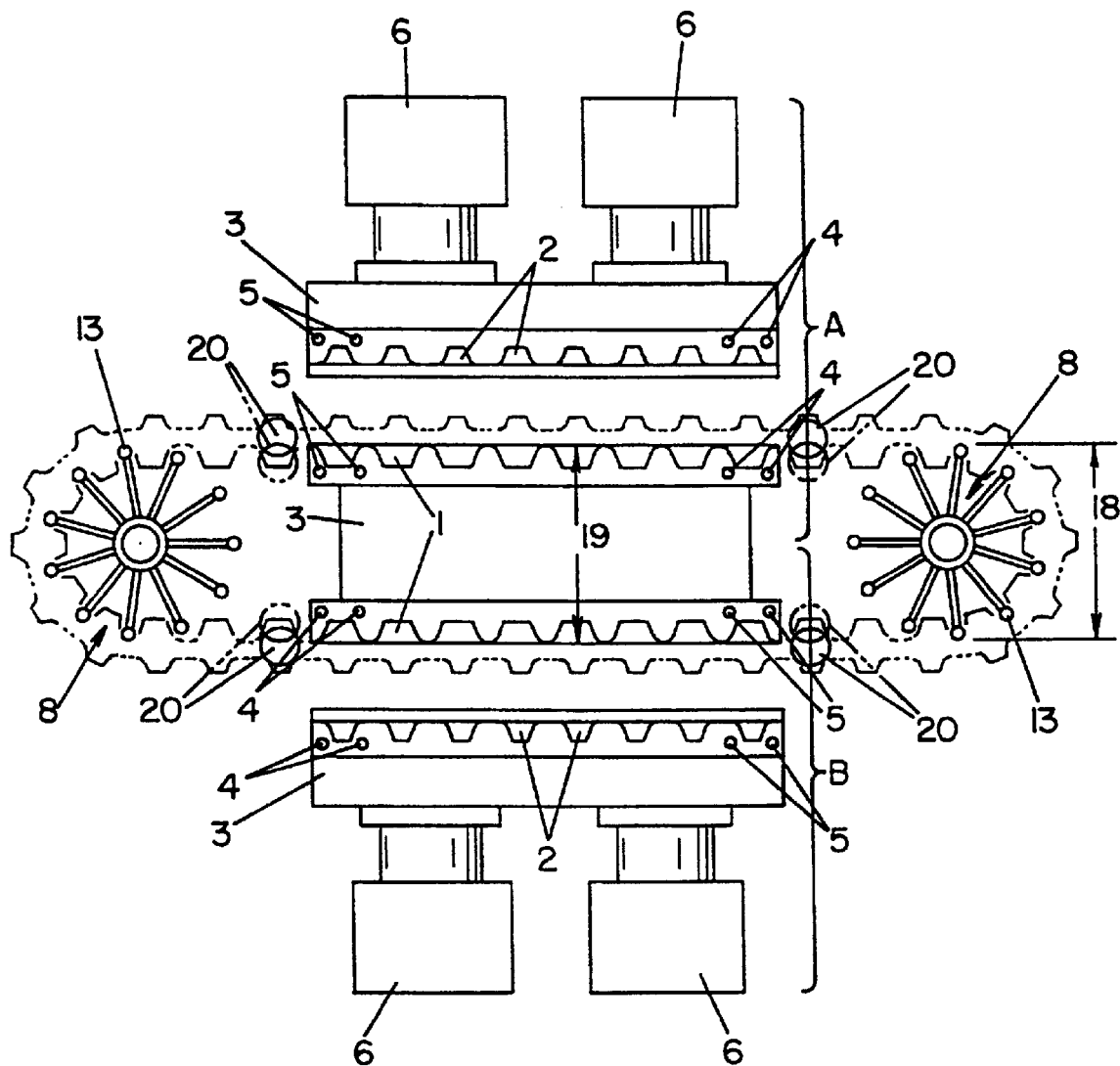
FIG. 1 is an elevational cross-sectional view of the apparatus used in the method of the present invention, showing the finished track in phantom lines.
Figure 2:
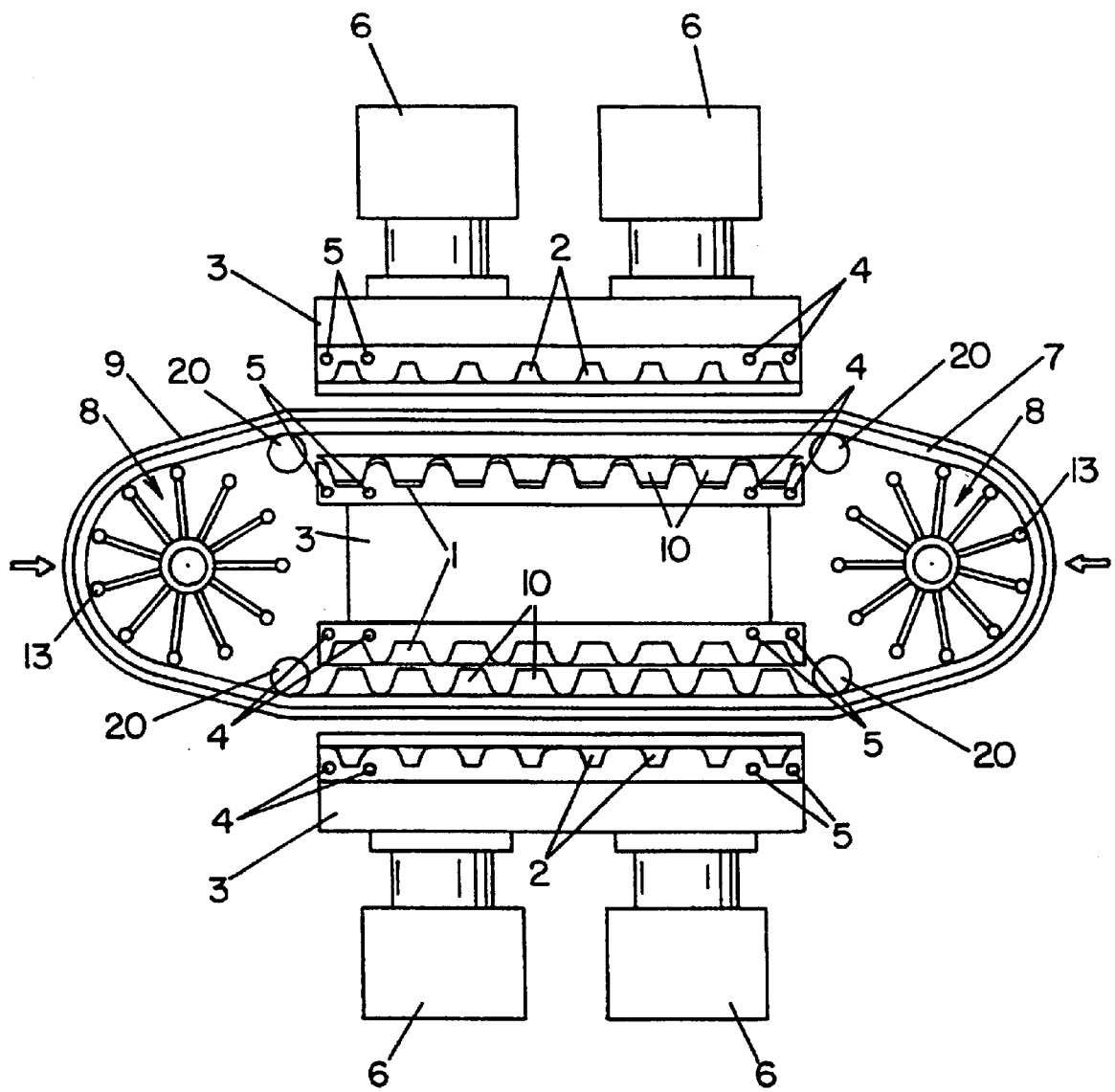
FIG. 2 shows the apparatus of FIG. 1 with a built-up carcass and guide lug slugs added prior to the first heat cycle.
Figure 3:
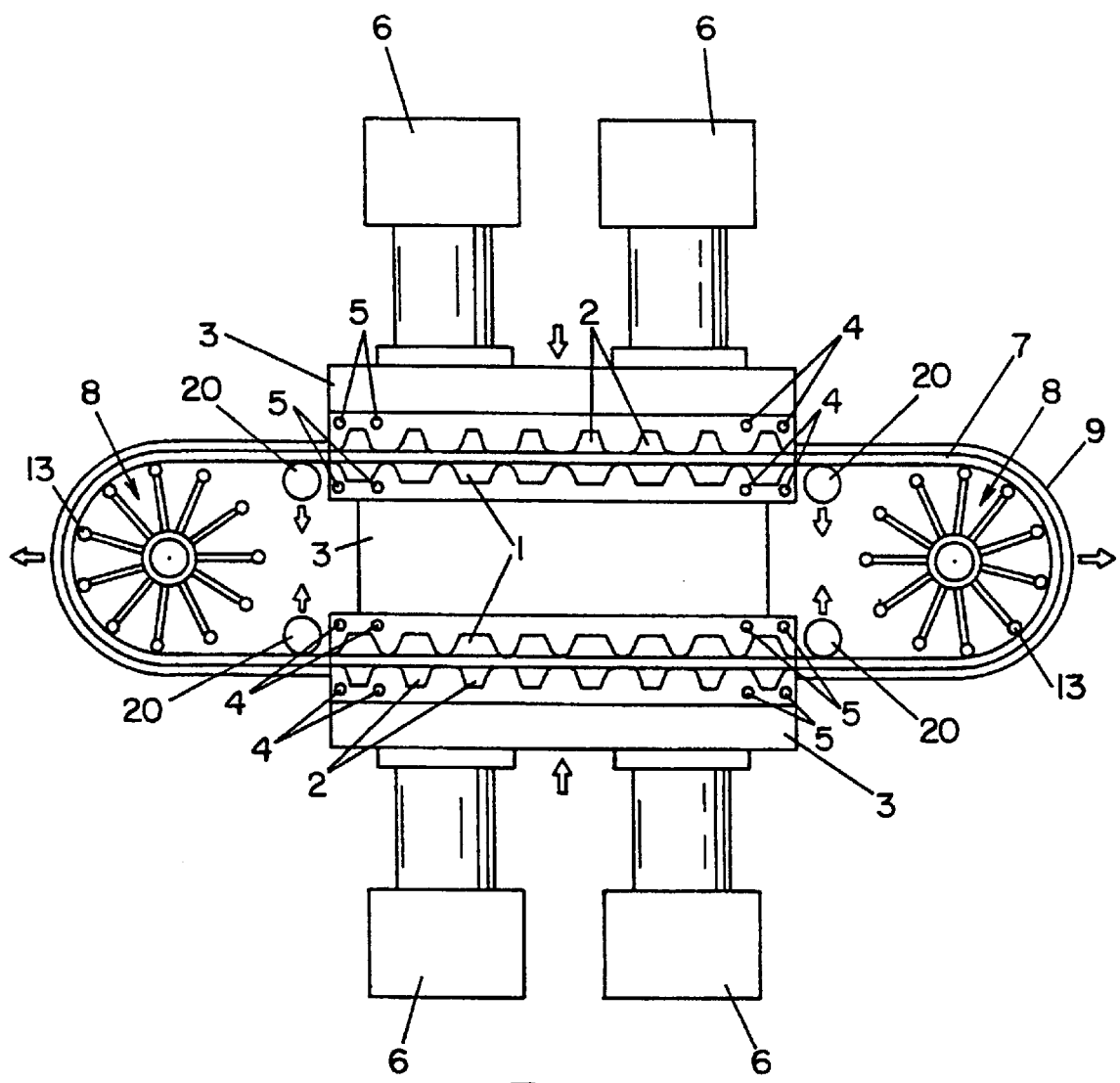
FIG. 3 shows the condition of the apparatus during the first heat cycle.
Figure 4:
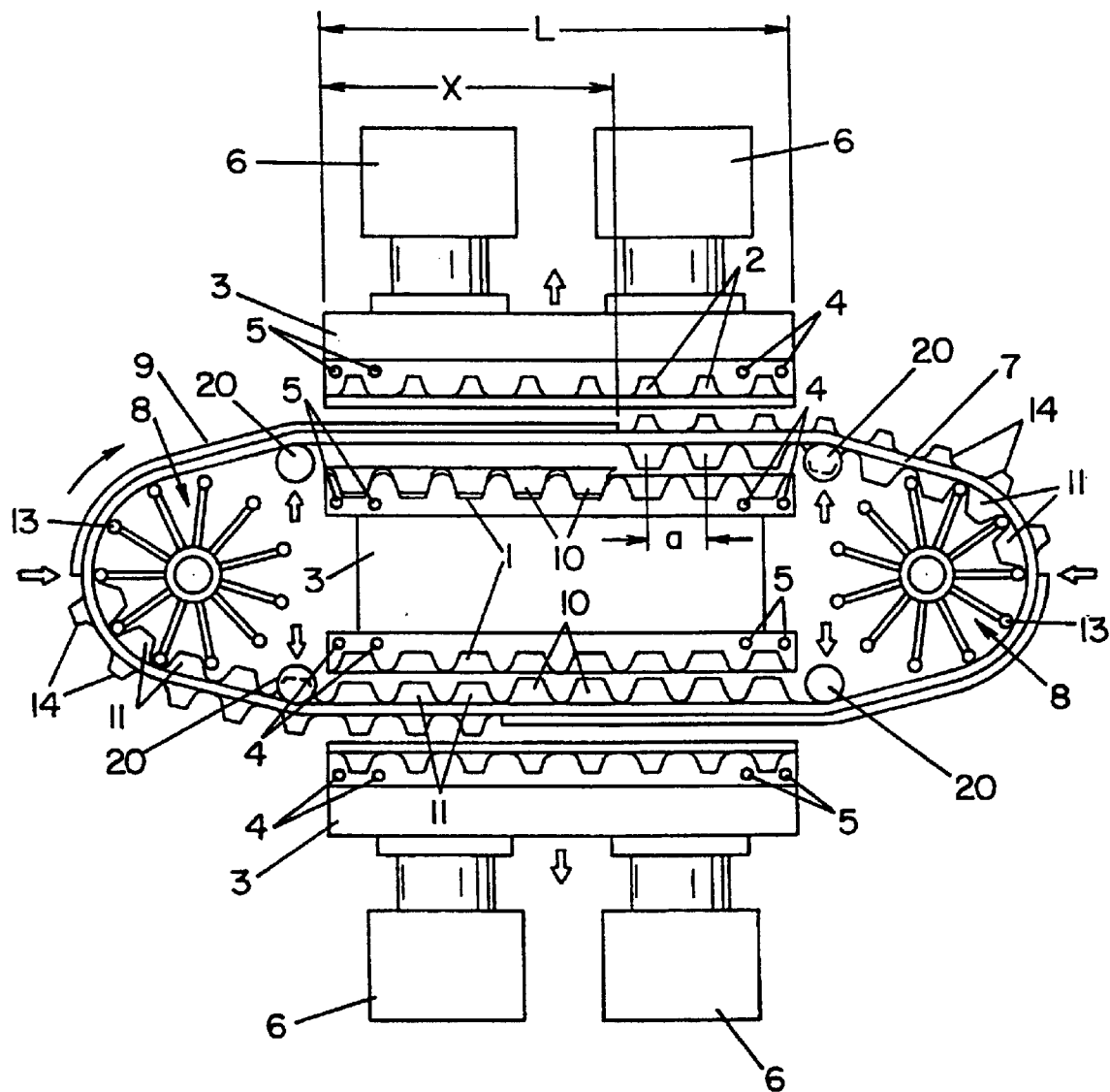
FIG. 4 illustrates the indexing of the track belt after the first heat cycle and preparation for the second heat cycle.
Figure 5:
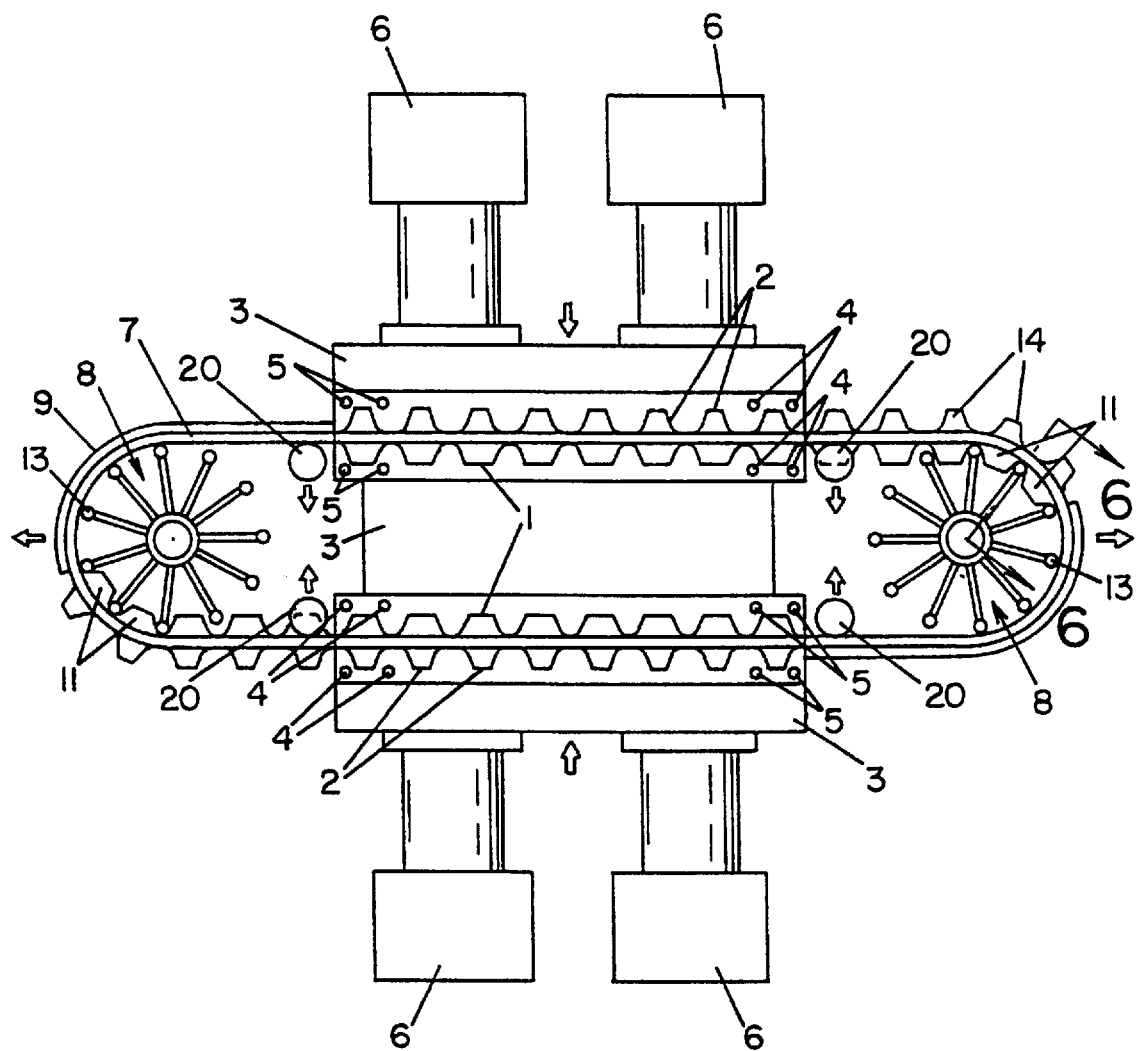
FIG. 5 illustrates the mold assemblies closed during the second heat cycle.
Figure 6:
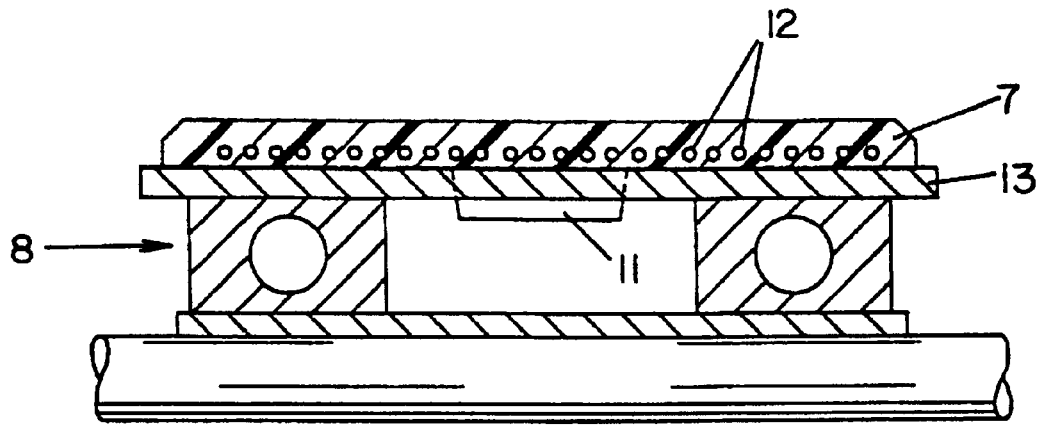
FIG. 6 is a cross-sectional view of that portion of the track and fully supporting indexing wheel taken along line 6—6 of FIG. 5.

The invention comprises a method of curing elastomeric endless track belts while solving the problems of the prior art methods of having the elastomers flow out of the sides and the ends of the molds as well as within the carcass of the track belt, thereby causing movement of the inner reinforcement. The method provides a pair of upper A and lower B mold assemblies having entrance ends and exit ends with cooling water ports 4,5 at each end. There are outer tread lug cavities 2 on one-half of each of the mold assemblies and inner guide lug cavities 1 in the other half of the mold assemblies. At each opposing end of the mold assemblies are located fully supporting index wheels 8 as illustrated in FIGS. 6 and 7 which maintain an even tension across the width of the belt.

Inner guide lug cavities 1 are located in one-half of the molds while outer tread lug cavities 2 are located in the other half of the molds. The exit end cooling water ports 4 and the entrance end cooling water ports 5 are located such as to maintain a selected number of cavities below 100° C. in order to prevent full vulcanization of the predetermined number of the guide lug cavities 1 and tread lug cavities 2.

A green track belt carcass 7 similar to that disclosed in U.S. Pat. Nos. 5,211,609 and 5,575,729 generally having a longitudinal cable reinforcement (shown as reference numeral 12 in FIGS. 6 and 7b) is provided and placed around the indexing wheels 8 between the mold cavities 1 and 2. There are several ways to provide the compound for filling the tread lugs 2 and the guide lugs 1. Slugs of the compounds can be provided either as non-premolded extruded pieces which are cut to length, approximately the shape of the lug cross-sectional contour. At the ends they are cut on a bias to more approximate the ends of the cavities, or the slugs may be premolded similar to what is illustrated in U.S. Pat. No. 5,536,464. Another way to provide lug compounds to the inner surface of the carcass or the outer surface of the carcass is to buildup the surface of the carcass with slab stock applied either as single pieces or as a continuous sheet of rubber repeatedly wrapped around either the inner or outer surface of the green belt. The preferred method in the instant invention is to use a built-up slab of compound for the outer tread lug and to use non-premolded compound slugs for the inner guide lugs.

Figure 7A:
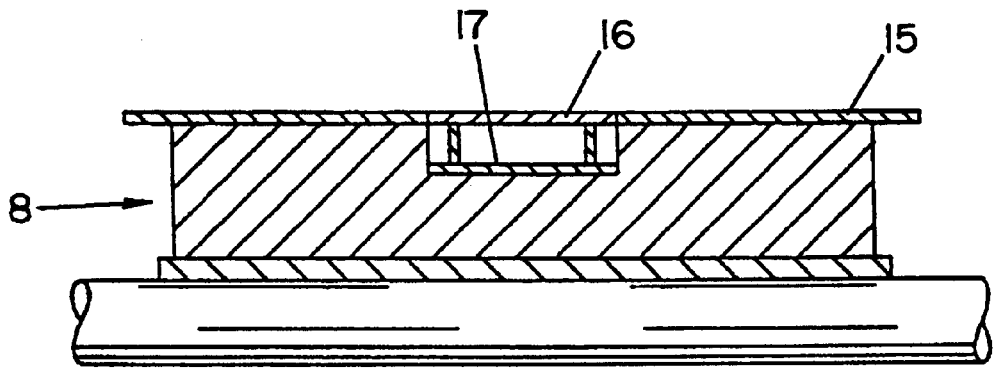
FIGS. 7(a) and 7(b) illustrate a cross-sectional view of an alternative embodiment of an indexing wheel similar to FIG. 6.
Figure 7B:
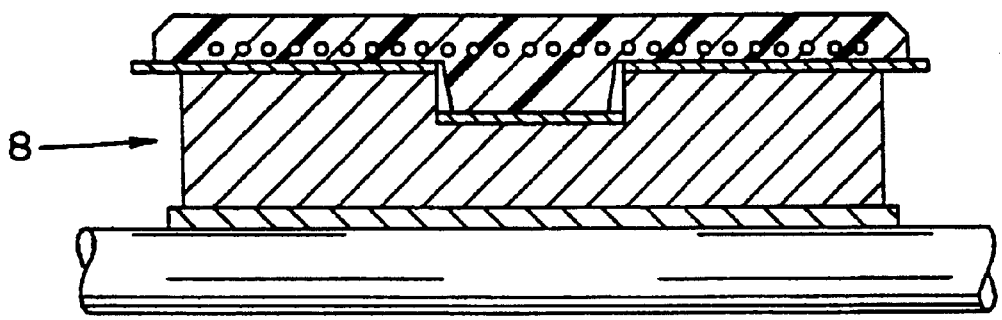

The indexing wheels 8 are fully supporting in that they maintain an even tension across the width of the belt to support the inner reinforcement 12 and not allow it to move during the curing operation. FIG. 6 illustrates one embodiment of the indexing wheel 8 having wheel bars 13 which cover the entire bottom surface of the inner surface of the belt 7 except for the lug 11, while FIGS. 7a and 7b illustrate an indexing wheel 8 having a round drum 15 with removable shelves 16 and secondary support surfaces 17. The removable shelves 16 provide support for the green belt carcass that is tensioned prior to and during the first heat, absent the presence of inner guide lugs. The shelves 16 are removed after the first heat, when inner guide lugs are present, to allow the inner guide lugs to enter the cavity and the bottom of the guide lugs 11 are supported by the secondary surface 17.

The fully supporting indexing wheels 8 maintain a force on the green track belt 7 of 0.14 MPa to 3.5 MPa, preferably 0.17 MPa to 5.2 MPa during the curing cycle.

With the green belt carcass 7 having a slab 9 of tread lug compound built-up thereon is between the mold halves, non-preformed slugs of inner guide lug compound 10 are placed in the inner guide lug cavities of the upper mold assembly A and on the carcass 7 opposite the guide lug cavities 1 of the lower mold assembly B. Cooling water is turned on to both the exit end water ports 4 and the entrance water ports 5. Curing is provided by platens 3 at temperatures of 95° C. to 165° C. Pressure is provided by pressure cylinders 6 and pressure is applied in a series of bumps which may be defined by applying the pressure for a predetermined amount of time followed by releasing the pressure either to no pressure or a somewhat lower pressure than the initial high pressure. This bumping action goes to carefully form the outer tread lugs 14 and the inner guide lugs 11 while preventing distortion or damage to the lug compounds. Cavity pressure during this bumping action can range from 1.4 MPa to 8.4 MPa, while a range of 2 MPa–3.3 MPa is preferred. Following the series of bumps, a constant lower pressure is applied to allow the lugs to expand into the cavities and to allow the molds to separate or gap in order to prevent the flow of the compound out of the ends of the mold. This lower pressure can range between 0.35 MPa–1.3 MPa, while it is preferred that the range be between 0.5 MPa–1 MPa. This pressure is maintained until the first heat is completed, resulting in the curing of the lugs which are in the central portion of the molds while those cavities which are in the cold regions, at the ends of the molds, are in various states of semi-vulcanization.

After the first heat is completed, the mold halves are separated and the belt is indexed a distance x which is between 1a and L-na, where a=the pitch length of the inner guide lugs, L is the length of the mold and n is the number of pitches in the cold end. As such, the lugs which were formed in the cavities next to the cold end are aligned with the cavities at the cold exit end of the molds 4. At this point, the cooling water is shut off the exit ends of the molds 4 in order to allow for the complete vulcanization of those lugs which were previously at the entrance end for the first heat. This condition is allowed to exist for the second to the final heat.

Additional slugs of guide lug compound are placed in the empty cavities of the upper molds and on the carcass opposite the empty cavities of the lower molds for each of the remaining heats. For the final heat, the semi-vulcanized lugs from the exit ends of the molds from the first heat are placed into the entrance cavities of the molds and the cooling water is turned off the entrance end cooling water ports (5) in order to allow the completion of the vulcanization. Each heat provides the bumping action at the high pressure to form the lugs followed by the lower pressure for the completion of the cure cycle. This process has been found to prevent the flow of material out of the ends of the molds as well as to prevent the distortion of the reinforcement within the carcass of the belt. After the final heat, the finished track is removed from the mold assemblies.

As can be appreciated, when using non-preformed lugs for the outer tread, the lugs of the tread compound are placed on the carcass of the green track belt in the upper mold assembly and in the tread lug cavities of the lower mold assembly.

Wheel diameter (18) of the indexing wheel is always equal to or less than the thickness (19) of the center lug mold/platen package. This aids in alignment of the green belt (7) to the mold cavities and insures that the closing of the lug molds does not cause an overtightening of the belt. Expanding rollers (20) are provided to disengage the lugs from the cavities during the indexing operation.

What is claimed is:

1. A method for curing endless track belts comprising:
   a) providing a pair of upper and lower heated mold assemblies having an entrance end, an exit end, cooling water ports at each end, outer tread lug cavities in one half of a mold assembly, inner guide lug cavities in the other half of the mold assembly and a pair of fully supporting indexing wheels on opposing ends of the mold assemblies;
   b) placing a green track belt carcass in between the mold halves and around the indexing wheels, the green track belt carcass having a slab of tread lug compound built up on the outer surface thereof; wherein the slab stock is applied as single pieces or a continuous sheet of rubber repeatably wrapped around the outer surface;
   c) placing non-preformed slugs of inner guide lug compound in the inner guide lug cavities of the upper mold assembly and on the carcass opposite the guide lug cavities of the lower mold assembly;
   d) turning on the water to all the cooling ports;
   e) closing the mold halves at such a designated high pressure and applying a first heat to form the tread lugs and inner guide lugs in a series of alternating bumps between high pressure and a much lower or no pressure to form the lugs;

f) applying a constant lower pressure to allow the lugs to expand into the cavities and the molds to separate until the first heat is complete;

g) opening the mold halves and indexing the belt a distance x which is less than the length of the molds until the lugs that were formed in the cavities next to the cold entrance end are aligned with the cavities at the exit end;

h) shutting off the cooling water port at the exit end of the molds;

i) placing additional slugs of inner guide lug compound in the empty cavities of the upper mold and on the carcass opposite the empty cavities of the lower mold and repeating steps e, f and g for a second and subsequent heats prior to the final heat, proceeding to step (j) for the final heat;

j) prior to applying the final heat, shutting off the cold water port to the entrance ends of the molds;

k) placing additional slugs of inner guide lug compound in the empty cavities of the upper mold A and on the carcass opposite the empty cavities of the lower mold and repeating steps e and f to form the final track belt; and l) opening the mold halves and removing the track belt from the mold assemblies.

2. The method of claim 1 wherein the high pressure is between 1.4 MPa–8.4 MPa.

3. The method of claim 1 wherein the high pressure is between 2.0 MPa–3.3 MPa.

4. The method according to claim 1 wherein the lower pressure is between 0.35 MPa–1.3 MPa.

5. The method according to claim 2 wherein the lower pressure is between 0.35 MPa–1.3 MPa.

6. The method according to claim 3 wherein the lower pressure is between 0.5 MPa–1.0 MPa.

7. The method for curing endless track belt comprising: providing a pair of upper and lower heated mold assemblies having an entrance end, an exit end, cooling water ports at each end, outer tread lug cavities in one half of a mold assembly, inner guide lug cavities in the other half of the mold assembly and a pair of fully supporting indexing wheels on opposing ends of the mold assemblies;

a) placing a green track belt carcass in between the mold halves and around the indexing wheels, the green track belt carcass having a slab of tread lug compound built-up on the outer surface and a slab of inner guide lug compound built-up on the inner surface thereof; wherein the slab stocks are applied as single pieces or as a continuous sheet of rubber repeatably wrapped around the outer and inner surfaces;

b) turning on the water at all cooling ports;

c) closing the mold halves at such a designated high pressure and applying a first heat to form the tread lugs and inner guide lugs in a series of alternating bumps between high pressure and a much lower or no pressure to form the lugs;

d) applying a constant lower pressure to allow the lugs to expand into the cavities and the molds to separate until the first heat is complete;

e) opening the mold halves and indexing the belt a distance x which is less than the length of the molds until the lugs that were formed in the cavities next to the cold entrance end are aligned with the cavities at the exit end;

f) shutting off the cooling water port at the exit end of the molds;

g) repeating steps c, d and e to form a second and subsequent heats prior to a final heat, proceeding to step (h) for the final heat;

h) prior to applying the final heat, shutting off the cooling water port at the entrance end of the molds;

i) repeating steps c and d to form the final belt; and j) opening the mold halves and removing the track belt from the mold assemblies.

8. The method according to claim 7 wherein the high pressure is between 1.4 and MPa of 8.

9. The method of claim 7 wherein the high pressure is between 2.0 MPa–3.3 MPa.

10. The method according to claim 7 wherein the lower pressure is between 0.35 MPa–1.3 MPa.

11. The method according to claim 8 wherein the lower pressure is between 0.35 MPa–1.3 MPa.

12. The method according to claim 9 wherein the lower pressure is between 0.5 MPa–1.0 MPa.

13. The method of curing endless track belts comprising:

a) providing a pair of upper and lower heated mold assemblies having an entrance end, an exit end, cooling water ports at each end, outer tread lug cavities in one half of a mold assembly, inner guide lug cavities in the other half of the mold assembly and a pair of fully supporting indexing wheels on opposing ends of the mold assemblies;

b) placing a green track belt carcass in-between the mold halves and around the indexing wheels;

c) placing non-preformed slugs of inner lug compound in the inner guide lug cavities of the upper mold assembly and on the carcass opposite the guide lug cavities of the lower mold assemblies and slugs of tread lug compound in the tread lug cavities of the lower mold assembly on the carcass opposite the tread lug cavities of the upper mold assemblies;

d) turning on the water to all cooling ports;

e) closing the mold halves at such a designated high pressure and applying a first heat to form the tread lugs and guide lugs in a series of alternating bumps between high pressure and a much lower or no pressure to form the lugs;

f) applying a constant lower pressure to allow the lugs to expand into the cavities and the molds to separate until the first heat is complete;

g) opening the mold halves and indexing the belt a distance x which is less than the length of the molds until the lugs that were formed in the cavities next to the cold entrance end are aligned with the cavities at the exit end;

h) shutting off the cooling water port at the exit end of the molds;

i) placing additional slugs of guide lug compound in the empty cavities of the upper mold and on the carcass opposite the empty cavities of the lower mold and placing additional slugs of tread lug compound in the empty cavities of the lower mold and on the carcass opposite the empty cavities of the upper mold and repeating steps e, f and g for a second and subsequent heats prior to a final heat, proceeding to step 0) for the final heat;

j) prior to applying the final heat shutting off the cold water port to the entrance ends of the molds;

k) placing additional slugs of guide lug compound in the empty cavities of the upper mold A and on the carcass opposite the empty cavities of the lower mold and placing additional slugs of tread lug compound in the empty cavities of the lower mold and on the carcass opposite the empty cavities of the upper mold and repeating steps e and f to form the final track belt; and k) opening the mold halves and removing the track belt from the mold assemblies.

14. The method according to claim 13 wherein the high pressure is between 1.4 and MPa of 8.

15. The method of claim 13 wherein the high pressure is between 2.0 MPa–3.3 MPa's.

16. The method according to claim 13 wherein the lower pressure is between 0.35 MPa–1.3 MPa.

17. The method according to claim 14 wherein the lower pressure is between 0.35 MPa–1.3 MPa.

18. The method according to claim 15 wherein the lower pressure is between 0.5 MPa–1.0 MPa.

19. An apparatus for curing large endless rubber track belts having:

a) a pair of double platen mold assemblies having outer tread lug cavities, inner guide lug cavities, entrance ends, exit ends and cooling water ports at each end;

b) pressure cylinders to impart a cavity pressure of 1.4 to 8.4 MPa; and c) fully supporting indexing wheels; wherein the indexing wheels provide support across the entire width of the belt with a force sufficient to maintain an even tension across the width of the belt to support the inner reinforcement and not allow the belt to move during the curing cycle, the apparatus characterized by;

an indexing wheel having a round drum with removable shelves and secondary support surfaces, the removable shelves providing support for the green belt carcass that is tensioned prior to and during the first heat, absent the presence of inner guide lugs and; wherein the shelves are removed after the first heat, when inner guide lugs are present, to allow the inner guide lugs to enter the cavity and the bottom of the guide lugs are supported by the secondary surface.

* * * * *